[54] EXHAUST GAS COMPOSITION CONTROL WITH AFTER-BURNER FOR USE WITH INTERNAL COMBUSTION ENGINES

[75] Inventors: Peter Schmidt; Harald Kizler; Wolfgang Maisch, all of Schwieberdingen; Bernd Peter, Kornwestheim; Josef Wahl, Stuttgart; Ernst Linder, Mullacker; Horst Neidhard, Korntal, all of Germany

[73] Assignee: Robert Bosch GmbH, Gerlingen-Schillerhohe, Germany

[22] Filed: June 2, 1972

[21] Appl. No.: 259,157

[30] Foreign Application Priority Data
Jan. 20, 1972  Germany............................ 2202614

[52] U.S. Cl.................... 60/276, 60/285, 60/301, 123/32 EA, 123/119 R
[51] Int. Cl........................................... F02b 75/10
[58] Field of Search ............ 60/274, 285, 276, 301; 123/124 R, 124 A, 124 B, 32 EA, 119 D, 119 R

[56] References Cited
UNITED STATES PATENTS

| | | |
|---|---|---|
| 3,406,515 | 10/1968 | Behrens............................ 60/274 |
| 3,442,773 | 5/1969 | Wilson............................. 204/195 S |
| 3,464,801 | 9/1969 | Barstow............................ 60/301 |
| 3,544,264 | 12/1970 | Hardison........................... 60/301 |
| 3,599,427 | 8/1971 | Jones............................... 60/274 |
| 3,616,274 | 10/1971 | Eddy................................. 60/276 |
| 3,626,915 | 12/1971 | Nakajima......................... 123/119 D |
| 3,680,318 | 8/1972 | Nakajima......................... 60/288 |
| 3,696,618 | 10/1972 | Boyd................................. 60/276 |
| 3,730,157 | 5/1973 | Gerhold............................ 60/285 |
| 3,738,341 | 6/1973 | Loos.................................. 60/285 |
| 3,768,259 | 10/1973 | Carnahan......................... 60/285 |
| 3,803,839 | 4/1974 | Santiago........................... 60/274 |

Primary Examiner—Douglas Hart
Attorney, Agent, or Firm—Flynn & Frishauf

[57] ABSTRACT

A thermo reactor is formed as an after-burner to receive the exhaust gases and burn CO and unburned hydrocarbons; connected in series therewith, downstream, is a catalytic reactor to reduce nitrogen oxides. An oxygen sensor is exposed to the exhaust gas stream between the thermo reactor and the catalytic reactor and supplies a control signal to an amplifier which, in turn, controls one or both of the components air and fuel of the fuel-air mixture to the engine in such relative proportions of mass that the exhaust sensed by the sensor is just slightly below the stoichiometric ratio of air and fuel ($\lambda = 1.0$).

17 Claims, 8 Drawing Figures

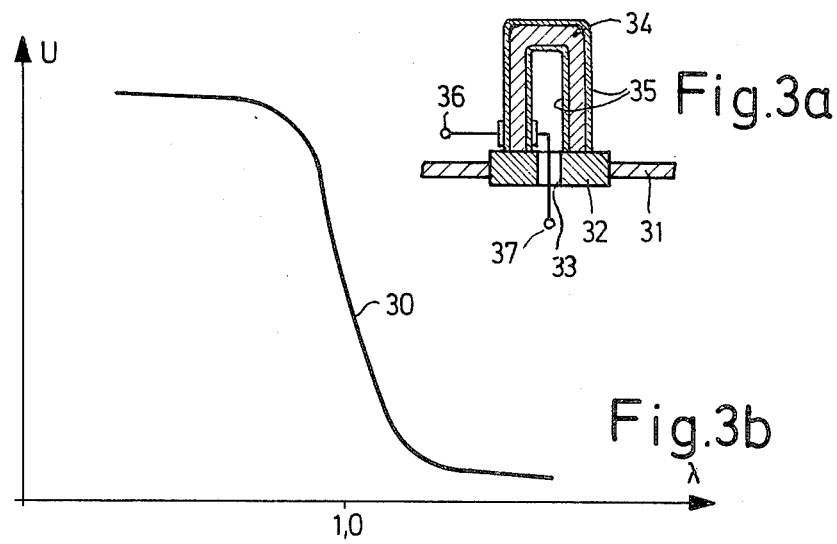
Fig.3a
Fig.3b
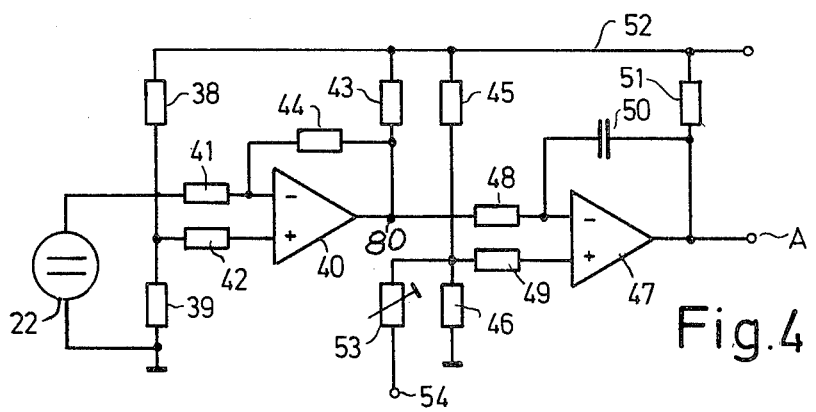
Fig.4
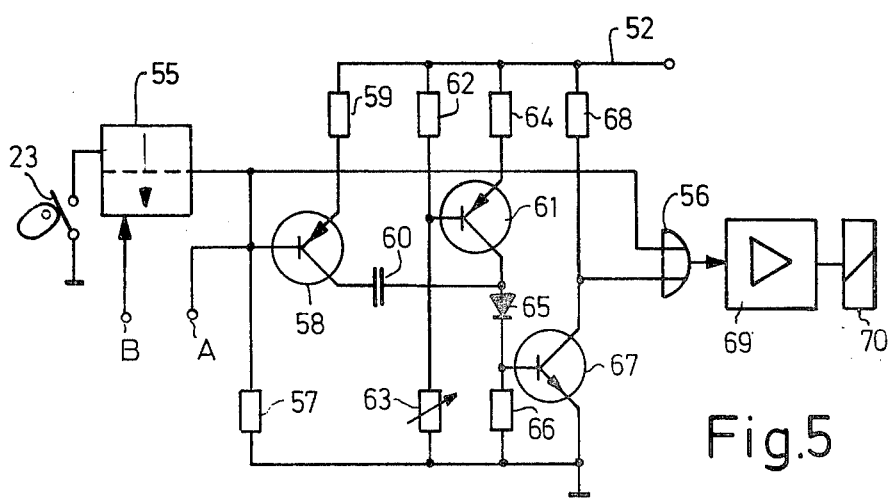
Fig.5

EXHAUST GAS COMPOSITION CONTROL WITH AFTER-BURNER FOR USE WITH INTERNAL COMBUSTION ENGINES

CROSS REFERENCE TO RELATED PATENTS AND APPLICATIONS

U.S. Pat. No. 3,483,851, Reichardt, Dec. 16, 1969.
U.S. Pat. No. 3,745,768, Zechnall et al., July 17, 1973.
U.S. Ser. No. 265,547, filed June 23, 1972
U.S. Ser. No. 259,134, filed June 2, 1972
U.S. Ser. No. 259,254, filed June 2, 1972 now U.S. Pat. No. 3,782,347
U.S. Ser. No. 298,108, filed Oct. 16, 1972

The present invention relates to a control system for controlling the composition of exhaust gas, including an after-burner, for use with internal combustion engines and more particularly to a system which includes a thermo reactor to burn carbon monoxide and unburned hydrocarbons, and a second, catalytic reactor to reduce nitrogen oxides, so that the final exhaust gases from the internal combustion engine will be as free from polluting substances as possible.

It has previously been proposed to clean the exhaust gases from internal combustion engines by located two serially connected reactors, the first one (with respect to flow of the exhaust gases) removing unburned hydrocarbons and carbon monoxide, and the second reactor reducing nitrogen oxides by means of added ammonia. Such systems require a fair amount of equipment, since two separate catalysts are required, that is, so-called two-bed catalysts, and further since ammonia must be available which, in a vehicle, would have to be carried with it.

It is an object of the present invention to provide an exhaust pollution eliminating system which is greatly simplified, and in which the reactors for the different polluting substances are separated. Nevertheless, the exhaust gas should not contain any more or other polluting substances than known devices.

Subject matter of the present invention: Briefly, the first reactor is a thermo reactor to burn carbon monoxide and still remaining hydrocarbons. It is followed by a second, catalytic reactor. An oxygen-sensing device is located to be exposed to the stream of gas derived from the first thermo reactor which, preferably connected over a control amplifier, controls the mixture of fuel and air in such a manner that the ratio of fuel to air is controlled to be just slightly below the stoichiometric value.

Reference in the specification will be made to the air number, denoted lambda ($\lambda$). This air number $\lambda$ is a measure of the composition of the air-fuel mixture. The number $\lambda$ is proportional to the mass of air and fuel, and the value of this number $\lambda$ is one ($\lambda = 1.0$) if a stoichiometric mixture is present. Under stoichiometric conditions, the mixture has such a composition that, in view of the chemical reactions, all hydrocarbons in the fuel can theoretically combine with the oxygen in the air to provide complete combustion to carbon dioxide and water. In actual practice, even with a stoichiometric mixture, unburned noncombusted hydrocarbons and carbon monoxide are contained in the exhaust gases.

By controlling the air number $\lambda$ to a value in the order of, preferably, about 0.98, the basic emission of carbon monoxide and unburned hydrocarbon will have a very low value. A simple thermo reactor can be used for after-burning of these components. Nevertheless, a slight excess of carbon monoxide will remain, that is, the exhaust gases when entering the second, catalytic reactor, will be slightly reducing. Such slightly reducing characteristics of the exhaust gases provide for optimum reducing effect of the catalytic reactor.

The air number $\lambda$ can be accurately controlled when, in accordance with a feature of the invention, the oxygen sensor includes an oxygen ion conductive solid electrolyte which is exposed both to the exhaust stream between the two reactors and, additionally, to ambient air. The electrical output signal of such a sensing element jumps at the exact value of $\lambda = 1$ since, even at only slightly greater air numbers, unburned oxygen is all of a sudden present within the exhaust gases. In accordance with a further feature of the invention, the oxygen sensor is located between the two reactors since, even with air numbers which are less than one, the exhaust gases contain not only unburned hydrocarbons but also additionally oxygen which, however, is largely used within the thermo reactor.

The invention will be described by way of example with reference to the accompanying drawings, wherein:

FIG. 3a is a longitudinal schematic cross-sectional view of an ion oxygen gauge;

FIG. 3b is an operating characteristic of the output voltage U (ordinate) with respect to air number (abscissa);

FIG. 4 is a schematic circuit diagram of a control amplifier;

FIG. 5 is a schematic circuit diagram of a transistorized switching system;

Figure 7:
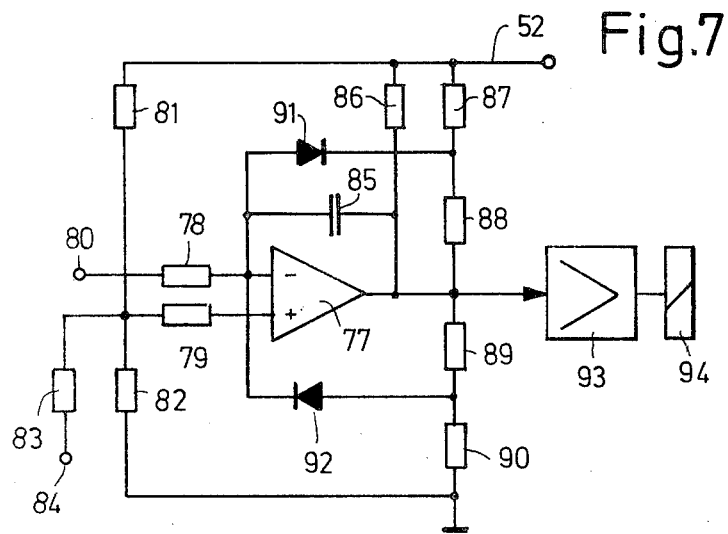

and FIG. 7 is a schematic circuit diagram of another embodiment of a control amplifier.

An internal combustion engine 11, for purposes of illustration shown as a four-cylinder engine, takes in air for combustion over an air filter 12 into an inlet duct 13. A throttle 15 is located within the inlet duct, the throttle position being changeable under control of an accelerator pedal. An air sensor 14, sensing the quantity of air passing through the inlet duct 13 is located ahead of the throttle 15. Air quantity sensor 14 may be a deflectable disk, which provides an electrical output depending on disk deflection against a spring, or the like, in accordance with the air flow through the duct 13. The cylinders, or selected cylinders of the internal combustion engine have fuel injection valves 16 associated therewith, only one of which is shown in the drawing. Fuel is supplied to the injection valves 16 over a fuel inlet line 17.

An exhaust manifold 18 is connected to the exhaust valves of the engine, the exhaust manifold 18 terminating in a thermo reactor 19. The thermo reactor 19, forming an afterburner, has its output connected to a catalytic reactor 20, so that the catalytic reactor is downstream from thermo reactor 19. An exhaust pipe 21, to which a muffler can be connected, as well known in the art is then connected to the catalytic reactor to exhaust the remaining $CO_2$ to ambient atmosphere.

An oxygen sensor 22 is located in the wall of the ducting leading from the thermo reactor 19 to the catalytic reactor 20. The output of the oxygen sensor 22 is connected to a control amplifier 24. The shaft of engine 11 is connected to a pulse source 23 which provides control pulses, in synchronism with rotation of the crankshaft of the engine, which are connected to a transistorized switching circuit 25. Switching circuit 25 provides pulses which determine the duration of the opening period of the fuel injection valve 16 (see cross-referenced U.S. Pat. No. 3,483,851). The pulse duration is influenced by the amount of air passing to the engine, that is, by the output signal from air sensor 14, as well as by the output of control amplifier 24, applied to inputs B and A, of the switching circuit 25, respectively. The injection valve 16 is operated by means of a magnet winding, connected to the output of the circuit 25.

Figure 2:
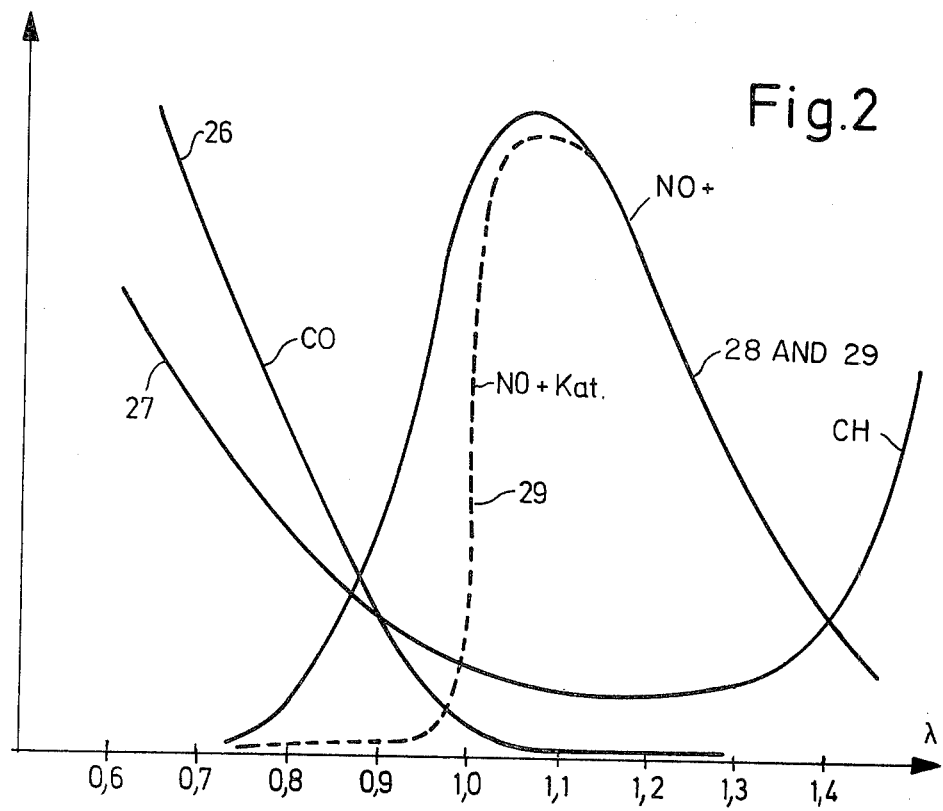
FIG. 2 is a diagram illustrating the relative contents of the components in the exhaust gas with respect to the air number (abscissa)

FIG. 2 illustrates the variation in composition of exhaust gases with respect to air number λ. If excess air is present, λ has a value greater than 1.0, the value being determined by the relationship of air to fuel.

Solid line 26 illustrates the relationship of carbon monoxide (CO); as a value of $\lambda = 1.0$ is approached, the CO value decreases steadily. Above $\lambda = 1.0$, the CO value remains essentially constant and is very low.

Curve 27 illustrates the relationship of unburned hydrocarbons CH with respect to λ; up to about $\lambda = 1.3$, the shape of the curve 27 is close to that of curve 26, representing CO. Above about $\lambda = 1.3$, the value of hydrocarbons rises rapidly. This is due to the increasing misfires which result if the mixture becomes very lean, so that the exhaust will again contain unburned hydrocarbons.

Curve 28 illustrates the relationship of nitrogen oxides, NOx with respect to λ; this curve is opposite the two curves 26, 27. A maximum value of nitrogen oxides arises at about $\lambda = 1.05$. At air numbers above and below 1.05, the nitrogen oxide compound curve decreases rapidly. This is due to fact that nitrogen oxygen compounds arise only at high combustion temperatures by combustion of nitrogen in the air. Combustion temperatures reach their maximum value when the mixture is roughly stoichiometric, that is, $\lambda =$ about 1. Curve 28 is the curve which represents the nitrogen oxides in the exhaust of the exhaust manifold 18. Curve 29, however, illustrates the contents of nitrogen oxides at the output of the catalytic reactor 20. When the gases applied to the reactor 20 are slightly reducing, that is, at air numbers at or just below $\lambda = 1.0$, the nitrogen oxides will react in the catalytic reactor with carbon monoxide and hydrogen from the unburned hydrocarbons CH. Thus, at low air numbers, there are practically no nitrogen oxides in the exhaust gas.

As $\lambda = 1.0$ is exceeded, the exhaust gases change their composition from reducing to oxidizing, that is, there will be more oxygen in the exhaust gases, and the nitrogen oxides NOx no longer can be reduced in the catalytic reactor 20, so that for larger air numbers, above 1.0, the two curves 28 and 29 coincide.

FIG. 3a illustrates the construction of an ion gauge or sensor. A solid, sintered electrolyte is formed into a tube 34, closed at one end. The solid electrolyte 34 has a platinum layer 35 vapor-deposited thereon, which platinum layer is microporous, or has micro fissures therein. The two platinum layers 35 are provided with contacts connected to electrical terminals 36, 37. A socket 32 holds the solid electrolyte tube 34 in the wall of the exhaust gas. Socket 32 is formed with a bore 33 through which ambient air from the outside can penetrate within the interior of the tube 34. The outer surface of tube 34 is exposed to the stream of exhaust gas flowing between the two reactors 19 and 20.

At the high temperatures, which are present in the exhaust gas stream, the solid electrolyte of the sensor 22 becomes oxygen ion conductive. The solid electrolyte may, for example, be zirconium dioxide. When the oxygen partial pressure within the exhaust gases deviates from the oxygen partial pressure in ambient air, a voltage will arise between terminals 36, 37, as illustrated in curve 30, FIG. 3b, with respect to λ. This voltage depends, logarithmetically, of the quotient of oxygen partial pressure at both sides of the solid electrolyte 34. Thus, the output voltage of sensor 22 jumps at the vicinity of $\lambda = 1.0$. This substantial and reliable dependence of the output voltage on the air number is used to control the control amplifier by the sensor of FIG. 3a.

The circuit of the control amplifier 24 is illustrated in FIG. 4. A first operational amplifier 40 amplifies the output signals of the oxygen sensor 22. Its output, appearing at junction 80, is connected to a second operational amplifier 47, connected as an integral controller. The oxygen sensor 22 is connected to an input resistance 41 and then to the inverting input of operational amplifier 40; the other terminal of sensor 22 is grounded, or connected to chassis. The non-inverting input of the operational amplifier 40 is connected over an input terminal 42 to the tap point of a voltage divider formed of resistors 38, 39. A feedback resistance 44 is connected between output junction 80 and the inverting input terminal of operational amplifier 40, the value of feedback resistance 44 determining the amplification factor. A resistance 43 connects junction 80 to the positive bus 52 of the supply.

The output junction 80 of operational amplifier 40 is connected over an input resistance 48 to the inverting input of operational amplifier 47. The non-inverting input of operational amplifier 47 is connected over a resistance 49 to the tap point of a voltage divider formed of resistors 45, 46. Additionally, the tap point is connected to a controllable resistance 53 and then to an input terminal 54. The operational amplifier 47 has a capacitor 50 in its feedback path, and is connected with a resistance 51 to positive bus 52. The capacitor 50 acts as an integrating capacitor. The output terminal of operational amplifier 47 forms terminal A.

The transistorized switching circuit 25 is shown in highly simplified form in FIG. 5. An input stage 55 which, in the present example, is a monostable multivibrator, changes state in synchronism with engine rotation, as schematically shown by switch 23 providing pulses under control of a cam. Switch 23 closes in synchronism with rotation of the crankshaft, so that each fuel injection valve 16 will have an injection pulse applied thereto at each second full rotation of the crankshaft (assuming a four-cycle engine). Correction input B controls the unstable pulse duration of the monostable state 55 in dependence on air mass being applied to the engine, that is, in the present example if greater airflow is measured, more fuel is to be injected, so that the air number can be held constant.

The output of monostable trigger stage 55 is connected to a pulse extending stage which includes a storage capacitor 60. The capacitor 60 has one of its electrodes connected to the collector of a transistor 58. The emitter of transistor 58 is connected over resistance 59 to positive bus 52. The base of transistor 58 is connected to the output of the monostable trigger stage 55 and, further, to the input terminal A which, further, forms the output terminal of the circuit of FIG. 4. A base resistance 57 connects to chassis.

The second terminal of the storage capacitor 60 is connected to the collector of a discharge transistor 61, which has its base connected to the tap point of a voltage divider formed of resistances 62 and 63, in which resistance 63 is variable. The emitter of the discharge transistor 61 is connected over resistance 64 to positive bus 52. A diode 65 is connected between the other terminal of capacitor 60, the collector of transistor 61, and the base of an inverter transistor 67, the diode being so poled that the collector current of the discharge transistor 61 is passed thereby. The base of inverter transistor 67 is connected to ground over resistance 66, and its collector over resistance 68 to positive supply bus 52.

The output of monostable trigger stage 55, as well as the collector of inverter transistor 67 is connected, each, with one of two inputs of an OR-gate 56, which has its output connected to a switching amplifier 69. Switching amplifier 69 controls a solenoid winding 70 which, in turn, controls the injection valve 16.

Operation (with reference to FIGS. 1–5): Basically, the operation of the circuit of FIG. 5 is similar to that referred to in the cross referenced U.S. Pat. No. 3,483,851 and will be referred to only briefly. The duration of the output pulses of the monostable multivibrator 55 depends on the quantity of air being passed to the input manifold, as above referred to. The output pulse of the monostable stage 55 is applied directly to the switching amplifier 69 over the OR-gate 56. The pulse from stage 55 is followed by an extension pulse derived from the stage formed by transistors 58 and 61. The duration of the extension pulse is proportional to the duration of the output pulses of the monostable stage 55 and, further, can be influenced by other operating parameters of the engine. Thus, the duration of the extension pulse is influenced by the value of the resistance of resistor 63; this resistor may, for example, be a negative temperature coefficient resistor, used to measure engine temperature, and influence the overall duration of the pulse in accordance therewith. The duration of the extension pulse can additionally be influenced by the voltage applied to input A. Voltage applied to this input A influences the charge current to the capacitor 60, applied over transistor 58, during the pulse duration of the monostable stage 55. This, then, influences the amplitude of the jump in voltage which is transferred at the end of the output pulse of the monostable stage 55 to the capacitor 60. Change in the resistance 63, however, affects the discharge current of condenser 60 through the resistor 63 and thus the period of time after which the inverter transistor 67 again becomes conductive after it first has been changed to blocked condition.

Further correction voltages can be applied to the base electrodes of the two transistors 58, 61. As an example, the mixture can be made richer during the start-up time of the internal combustion engine and as it warms up. The inverter transistor 67, under quiescent condition, is conductive. Transistor 67 can be blocked when a negative pulse is transferred from capacitor 60. The output signal at the collector of transistor 67, as the output signal of the monostable stage 55, is a ONE signal, that is, it corresponds to the voltage of the positive bus 52. The OR-gate 56 provides a ONE signal at its output, when one of its inputs has a ONE signal thereon. Thus, the output pulse of the pulse extension stage is added, in time, to the output pulse of the monostable trigger stage 55.

A special operating condition can now be described; let it be assumed that the output duration of the output pulse of the transistor switching circuit 25 is slightly too low. Too much fuel is injected and the mixture becomes too rich. As seen from FIG. 3b, the air number $\lambda$ which is smaller than 1 corresponds to a relatively high output voltage from the sensing element 22, shown in FIG. 3a.

The output voltage of the sensor 22 is amplified in operational amplifier 40. Since the operational amplifier 40 is connected as an inverter amplifier, the output voltage will have a negative value which is connected over input resistor 48 to the inverting input of the operational amplifier 47. This operational amplifier is connected as an integrator and thus integrates the negative input voltage in a positive direction. The output potential at terminal A slowly shifts in positive direction. This shift in positive direction of the input voltage at point A to the circuit of FIG. 5 will cause the charge current flowing through transistor 58 for condenser 60 to decrease. The pulse duration of the pulse extending stage is thus decreased so that the output of the OR-gate will have an overall pulse which is slightly shorter, since the extension pulse, added to that from the trigger stage 55, will be shorter. The solenoid winding 70 is energized for a shorter period of time, less fuel is injected and the air-fuel mixture becomes leaner, until the air number $\lambda = 1.0$. At that point, the output voltage of the oxygen sensor 22 switches to a very low value, that is, the voltage jumps rapidly to a low value and operational amplifier 47 then integrates in opposite direction to that above described. Integrating in negative direction causes more charge current to flow through transistor 58 to capacitor 60, so that the output pulses of the pulse extending stage increase again in time.

The output voltage of the oxygen sensor 22 thus corrects deviation from the air number $\lambda = 1.0$. By suitable dimensioning of the voltage dividers 38, 39 and 45, 46 (FIG. 4), the air number can be adjusted to a desired value, for example to an air number $\lambda = 0.98$. This is better than controlling the air number to a value of 1.0, exactly, since the catalytic reactor 20 is better able to decompose nitrogen oxides in a slightly reducing atmosphere. At such a value of an air number, that is, $\lambda = 0.98$, approximately, the increase in CO and unburned hydrocarbons is negligible.

The catalytic reactor 20 includes a ceramic catalyst which has active substances, preferably barium chromate and copper chromate. These substances are particularly suitable for catalytic reduction and oxidation reactions, since the chromates change their oxidation stage comparatively easily. The catalytic reactor is thus of the single bed, or single catalyst type. Reduction of nitrogen oxide compounds, which are usually present as NO and $NO_2$, is carried out primarily by carbon monoxide and the hydrogen from the unburned hydrocarbons. The ratio of effective mass of CO/H₂ is roughly 3 : 1.

The catalytic reactor 20 thus reduces not only the nitrogen oxygen compounds but, in the same process, further reduces the hydrocarbons and the carbon monoxide. The overall noxious substances in the exhaust gas and conducted by exhaust pipe 21 are extremely low.

Practical experiments have shown it to be particularly advantageous to utilize a control amplifier 24 which has an integrating control characteristic, so that remaining deviations from commanded values can be avoided reliably. Such remaining and permanent deviations could occur for example by changes in the sensing output voltage due to aging of the sensor.

Figure 6:
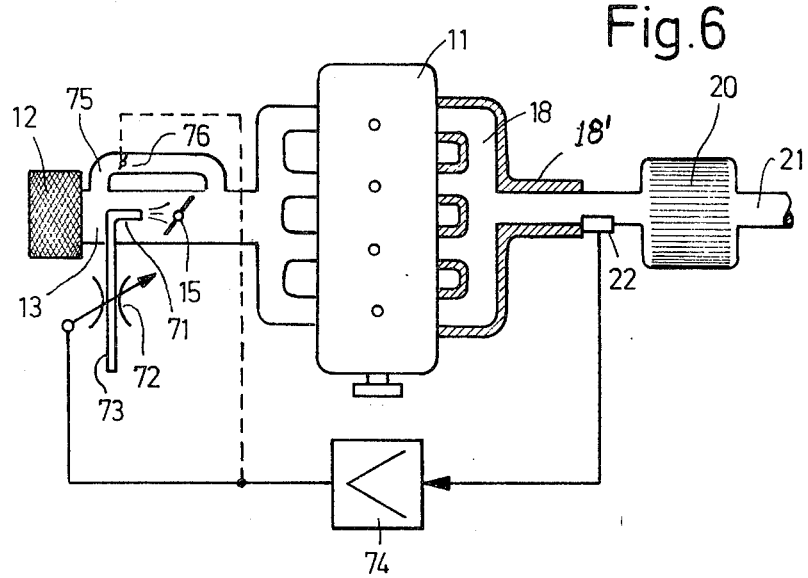
FIG. 6 is a schematic representation of a second embodiment of the present invention.

Referring now to the example of FIG. 6: The internal combustion engine 11 has fuel applied over a carburetor, shown only schematically. A throttle 15 is placed in the air stream, in advance of which a carburetor nozzle, shown schematically only at 71, is located. A fuel supply 73 supplies fuel to the carburetor nozzle 71. Nozzle 71 has a controllable valve 72 located therein, which is electrically operable, that is, the through-put of which can be electrically controlled. A bypass tube 75 is placed around the combination of fuel inlet 71 - throttle 15, to provide air downstream of the throttle to the inlet manifold of engine 11. The through-put of air through the bypass line 75 can be controlled by a bypass throttle 76, which is likewise electrically controllable. Additional air for combustion can thus be applied to the input of the engine, downstream of throttle 15, through the bypass 75, so that the air number of the fuel-air mixture being applied to the engine can be additionally controlled.

FIG. 6 illustrates another example of the thermo reactor, which is simplified, and can be used in this embodiment or that described in connection with FIGS. 1-5. The output manifold 18 is insulated thermally with respect to ambient air, as schematically indicated at 18'. Due to the thermal insulation of the output manifold, the walls of the output manifold will become hot and will reach temperatures of about 600° to 800° C. These temperatures are sufficient to provide for afterburning of carbon monoxide and hydrocarbons, which have not been completely burned within the engine itself.

As in the first example, a catalytic reactor is connected to the output manifold 18, the outlet of the catalytic reactor being connected to the exhaust pipes 21. The oxygen sensor 22 is located in advance of the catalytic reactor 20 in the wall of the duct leading thereto. The electrical output of the oxygen sensor 22 is connected to the input of a control amplifier 74, the output of which is connected to control the electrically operated valve 72 (solid line connection) and the additional bypass air throttle 76 (dashed line connection), or either one or the other. The choice whether both air and fuel, or only fuel, or only air, are to be controlled will be up to the eventual power output of the engine, and the designer of the overall system, and may be influenced by cost considerations of the various components involved.

The circuit of the control amplifier 74 is illustrated in part in FIG. 7. The input side of the control amplifier 74 is exactly the same as amplifier 24 of FIG. 4, and only that portion to the right of terminal 80 is shown. The oxygen sensor 22 is connected to operational amplifier 40, as before, for proportional amplification of the output signal from sensor 22. The subsequent integrating controller, connected to junction 80 (FIG. 4; FIG. 7) includes an operational amplifier 77, having an inverting input connected over a resistor 78.

The non-inverting input of the operation amplifier 77 is connected over resistor 79 to the tap point of a voltage divider formed of resistors 81, 82. The tap point of the resistor 81, 82 is further connected to an adjustable resistor 83 which is connected with input terminal 84. Input terminal 84 is connected, as input terminal 54 in FIG. 4, to apply correction voltages, which may, for example, be representative of the warming-up of the engine in operation. The output of operational amplifier 77 is connected over an integrating condenser 85 back to the inverting input and further over a resistance 86 to positive bus 52.

The output of operational amplifier 77 is connected to a voltage divider which is formed in each branch of a pair of resistances, forming sub-voltage dividers. Resistors 87, 88 connect the output of the operational amplifier to positive bus 52 and resistors 89, 90 connect the output of operational amplifier 77 to chassis or ground. The tap points of the voltage dividers 87, 88, and 89, 90, respectively, are connected, each, over a diode 91, 92 with the inverting output of the operational amplifier 77. Diode 91 is connected with its anode to the inverting input; diode 92 is connected with its cathode to the inverting input. The operational amplifier 77 is connected to a power amplifier 93 which controls the solenoid coil 94, acting as a positioning coil, which can be used to operate either the controlled valve 72 in the fuel supply, the controlled valve 76 in the air supply or both.

Figure 1:
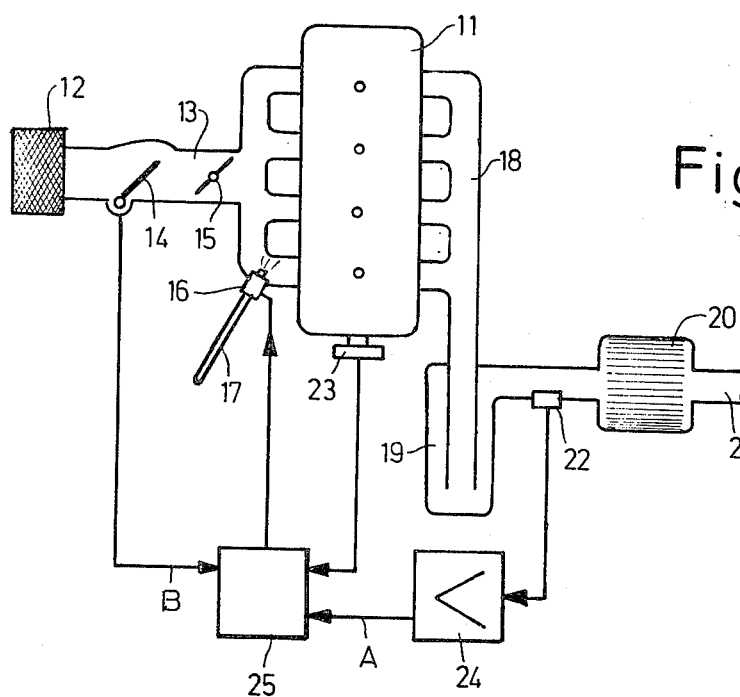
FIG. 1 is a schematic arrangement of one embodiment of the present invention.

The control amplifier 74 accordingn to FIGS. 6 and 7 differs from the amplifier 24 of FIGS. 1 and 4 by the two diodes 91, 92 and the voltage dividers 87, 88 and 89, 90. The function of the diodes 91, 92 connected into the voltage dividers is to limit the charge voltage of the integrating condenser 85 in the feedback path of operational amplifier 77. The integrating condenser 50 of FIG. 4 may be charged to the full operating voltage, for example, if the oxygen sensor 22 provides maximum output voltage due to low air number for an appreciable period of time. In this case, the output of operational amplifier 40 is at ground voltage, and the output of operational amplifier 47 gradually shifts to the output voltage of the positive bus 52 which, in an automotive vehicle, will usually approach 14 V. If the air number suddenly increases, integrating condenser 50 must be first discharged from the full operating voltage, which may take some time, and thus delay response.

The control amplifier 74 of FIG. 7 avoids this difficulty; if the input voltage 80 is close to chassis potential, the output voltage of operational amplifier 77 can shift in positive direction only to the voltage at which diode 92 becomes conductive. This voltage value is given by the voltage division ratio of resistors 89, 90. As soon as diode 92 becomes conductive, the voltage at the inverting input is driven to positive direction, so that the integrating condenser 85 cannot charge any further.

Diode 91 becomes active when the input terminal 80 is driven to positive voltage. The two diodes 91, 92 thus limit to some extent the control range of the amplifier unit 74 but provide for much faster response thereof, since the capacitor 85 need not change charge to such a great extent. Changes in output voltage of the sensor 22 thus are reflected faster to the positioning magnet winding 94. The integral controller of FIG. 7 can be used as the controller of FIG. 4 if the fuel is controlled by a fuel injection system in accordance with FIG. 1.

In general operation, the embodiment of FIG. 6 is similar to that of FIGS. 1–5. If the air number λ is too low, as sensed by sensor 22, which, therefore, provides high output voltage, operational amplifier 77 will provide a higher output voltage and the solenoid winding 94 is energized to a greater extent. The valve 72 is so constructed that, upon greater energization of solenoid winding 94, less fuel can be passed to the carburetor nozzle 71 in the inlet to the internal combustion engine. This increases the air number and the output voltage of the sensor 22 will decrease.

The controllable throttle 72 is so made that, as the energization of its control winding 94 increases, it opens wider. Thus, if the air number is too low, the bypass path is increased so that more air can be applied to the engine below the throttle 15, and the air number will increase.

If the controllable valve 72 for the fuel has sufficient control range, then bypass 75 could, in some instances, be omitted completely; conversely, the controllable valve 72 can be omitted if the bypass 75, with its controllable valve 76 is adequate to completely control the air flow to the engine.

The combination of a thermo reactor with a catalytic reactor, and a control arrangment for the air number λ provides effective after-burning of exhaust gases of an internal combustion engine and cleaning of these exhaust gases. The control characteristics of the control amplifiers 24, or 74, respectively, should include an integrating portion in order to reliably correct for remaining control deviations, or for drift. It is not critical for the operation of the system whether the fuel quantity is controlled by means of a fuel injection arrangement, or a controllable fuel supply through a carburetor, or by additional air supply to the inlet manifold of the engine, for example by a bypass from the main air filter. In any case, the exhaust gases can be effectively cleaned with little expense for the reactors.

Various changes and modifications may be made within the inventive concept.

What is claimed is:

1. Exhaust gas composition control system to reduce the emission of noxious gases, for use with an internal combustion engine comprising the combination of a thermo reactor (19, 18') forming an after-burner to burn carbon monoxide and unburned hydrocarbons, connected to directly receive the exhaust from the engine and a single catalyst catalytic reactor (20) of the reducing catalyst type connected downstream from the thermo reactor to receive the exhaust which has passed through the after-burner to reduce nitrogen oxides;

said system further comprising an oxygen sensor (22) located between the afterburner and the catalytic reactor and to be exposed to the exhaust gas stream after having passed the after-burner, the sensor (22) providing an output signal exhibiting a sharp transition jump when the sensed gases change from oxydizing to reducing state, to provide a signal representative of presence, or absence of oxygen in the exhaust stream to which the sensor is exposed;

means (25, 16, 72, 75, 76) controlling the application of at least one component of the fuel-air mixture to the engine, connected to and controlled by the output signal from the sensor (22) and regulating the relative proportions of mass of air and fuel of the mixture applied to the engine such that the proportion is just slightly below the stoichiometric ratio of air and fuel;

and an integrating control amplifier (24, 74) having its input connected to the sensor (22) and its output connected to the control means (25, 16, 72, 75, 76), said control amplifier including an operational amplifier (FIG. 7: 77) connected as an integrating amplifier, and having its input connected to the sensor, circuit means (87, 88, 91; 89, 90, 92) forming a reference, and connection means connecting the reference to the input of the operational amplifier to clamp the maximum integrating level of the operational amplifier to the level of the reference.

2. System according to claim 1, wherein the oxygen sensor (22) comprises a solid body (34) which conducts oxygen ions and which has two opposite faces, one face being exposed to the exhaust gases and the other to ambient air.

3. System according to claim 1, wherein the thermo reactor comprises at least a portion of the exhaust manifold (18), which portion is thermally insulated (18') with respect to ambient air to raise the temperature of the exhaust gases therein and provide for oxidation of CO and unburned hydrocarbons therein.

4. System according to claim 1, wherein the operational amplifier has feedback capacitor means (50, 85) in the feedback path between the input and output circuit thereof.

5. System according to claim 4, wherein the reference circuit means (FIG. 7) comprises a voltage divider (87, 88; 89, 90) having one terminal connected to the output of the operational amplifier and another to a reference source (52); and a diode (91; 92) interconnecting the tap point of the voltage divider and the control input of the operational amplifier to clamp the maximum input of the operational amplifier to the voltage level of the tap point.

6. System according to claim 1, wherein the control amplifier is connected to the sensor (22) and wherein the fuel-air mixture control means comprises a carburetor nozzle (71) and controllable fuel supply means (72) connected to the carburetor nozzle and applying fuel to the nozzle, said controllable fuel supply means being controlled by the control amplifier (74).

7. System according to claim 1, wherein the fuel-air mixture control means comprises an air inlet duct (13) and a controllable valve means (15) therein; an air duct (75) applying air to the inlet of the engine downstream of the controllable valve (15);

and means controlling air flow through the air duct under control of the output signal from said control amplifier.

8. System according to claim 7, wherein the air flow control means in the duct comprises an electrically operable throttle valve connected to the output of the control amplifier.

9. System according to claim 1, wherein the control means (25, 16, 72, 75, 76) is set to regulate the fuel-air mixture to provide an air number of about 0.98.

10. Exhaust emission control system for an internal combustion engine having means admitting air and fuel, respectively, comprising two serially connected reactors, one reactor being a thermo reactor (19, 18') connected directly to the exhaust of the engine to oxidize unburned hydrocarbons and carbon monoxide and the other reactor being a single catalyst catalytic reactor (20) of the reducing catalyst type to reduce nitrogen-oxygen compounds, the catalytic reactor (20), connected to the thermo reactor (18', 19) downstream therefrom;

duct means connecting the thermo reactor (18, 19') and, downstream, the catalytic reactor (20);

an oxygen ion sensitive oxygen gauge (22) located in said interconnecting duct means to be exposed on one side thereof to the exhaust gases which have passed through the thermo reactor (19, 18') and before being applied to the catalytic reactor (20), and the other side thereof being exposed to ambient air, said gauge providing an output signal exhibiting a sharp transition jump upon change of exhaust composition containing oxygen, or not containing oxygen;

and means controlling the fuel-air ratio of the fuelair mixture being applied to the engine under control of said oxygen gauge including a control loop from said gauge to the means admitting air and fuel, respectively, said loop being preset to control the fuel-air mixture to provide an air number of about 0.98 so as to be just under the stoichiometric ratio to permit after-burning of exhaust gases in the thermo reactor (19, 18') to remove oxygen from the exhaust and permit the catalytic reactor to operate under reducing conditions and to thereby remove nitrogen-oxygen compounds from the exhaust gases so that the gases exhausted from the catalytic reactor will be essentially free of unburned hydrocarbons, carbon monoxide, and nitrogen-oxygen compounds;

wherein the fuel-air mixture control means comprises an electronically controlled fuel injection system which includes a controllable switching circuit having control inputs (A, B), at least one fuel injection valve (16) supplied with fuel and opening for predetermined time periods under control of the switching circuit;

one control input (B) to the switching circuit having a signal applied thereto representative of air supply to the engine, and the other control input (A) having a signal applied thereto representative of the output of the oxygen gauge;

the switching circuit (25) comprises a monostable flip-flop stage (55) triggered in synchronism with the rotation of the engine and having a pulse duration controlled by the control input (B) representative of air being supplied to the engine; and wherein the switching circuit (25) further comprises a pulse extending stage connected to the monostable flipflop stage (55), and providing an extension pulse;

an OR-gate (56) having the outputs of the monostable flip-flop stage (55) and the pulse extending stage applied thereto to obtain a composite output pulse;

and a switching amplifier (69) controlled by the output of the OR-gate (56) connected to at least one injection valve (16) to energize the injection valve.

11. System according to claim 10, wherein the thermo reactor comprises at least a portion of the exhaust manifold (18) of the engine, said portion being thermally insulated (18') with respect to ambient air to provide a temperature range therein at which exhaust gases from the engine including CO and unburned hydrocarbons are oxidized.

12. System according to claim 10, further comprising an integrating control amplifier (24, 74) having its input connected to the sensor (22) and its output connected to the control means (25, 16, 72, 75, 76), said control amplifier including an operational amplifier (FIG. 7: 77) connected as an integrating amplifier, and having its input connected to the sensor, circuit means (87, 88, 91; 89, 90, 92) forming a reference, and connection means connecting the reference to the input of the operational amplifier to clamp the maximum integrating level of the operational amplifier to the level of the reference.

13. System according to claim 12, wherein the reference circuit means (FIG. 7) comprises a voltage divider (87, 88; 89, 90) having one terminal connected to the output of the operational amplifier and another to a reference source (52); and a diode (91; 92) interconnecting the tap point of the voltage divider and the control input of the operational amplifier to clamp the maximum input of the operational amplifier to the voltage level of the tap point.

14. Exhaust gas composition control system to reduce the emission of noxious gases, for use with an internal combustion engine comprising the combination of a thermo reactor (19, 18') forming an after-burner to burn carbon monoxide and unburned hydrocarbons, connected to directly receive the exhaust from the engine and a single catalyst catalytic reactor (20) of the reducing catalyst type connected downstream from the thermo reactor to receive the exhaust which has passed through the after-burner to reduce nitrogen oxides;

said system further comprising an oxygen sensor (22) located between the afterburner and the catalytic reactor and to be exposed to the exhaust gas stream after having passed the afterburner, the sensor (22) providing an output signal exhibiting a sharp transition jump when the sensed gases change from oxydizing to reducing state, to provide a signal representative of presence, or absence of oxygen in the exhaust stream to which the sensor is exposed;

means (25, 16, 72, 75, 76) controlling the application of at least one component of the fuel-air mixture to the engine, connected to and controlled by the output signal from the sensor (22) and regulating the relative proportions of mass of air and fuel of the mixture applied to the engine such that the proportion is just slightly below the stoichiometric ratio of air and fuel;

wherein the fuel-air mixture control means comprises an electronically controlled fuel injection system which includes a controllable, transistorized switching circuit (25), having control inputs (A, B), at least one fuel injection valve (16) supplied with fuel and opening for predetermined time periods under control of the switching circuit;

one control input (B) to the switching circuit having a signal applied thereto representative of air being supplied to the engine, and another control input (A) having the output of the sensor (22) applied thereto;

the switching circuit (25) comprises a monostable flip-flop stage (55) triggered in synchronism with the rotation of the engine and having a pulse duration controlled by the control input (B0 representative of air being supplied to the engine; and wherein the switching circuit (25) further comprises a pulse extending stage connected to the monostable flip-flop stage (55), and providing an extension pulse;

an OR-gate (56) having the outputs of the monostable flip-flop stage (55) and the pulse extending stage applied thereto to obtain a composite output pulse;

and a switching amplifier (69) controlled by the output of the OR-gate (56) connected to at least one injection valve (16) to energize the injection valve.

15. System according to claim 14, comprising a control amplifier connected to the sensor, and wherein the other control input (A) is connected to the pulse extending stage, the duration of the extension pulse being controllable by the output of the control amplifier (24).

16. System according to claim 14, further comprising an integrating control amplifier (24, 74) having its input connected to the sensor (22) and its output connected to the control means (25, 16, 72, 75, 76), said control amplifier including an operational amplifier (FIG. 7: 77) connected as an integrating amplifier, and having its input connected to the sensor, circuit means (87, 88, 91; 89, 90, 92) forming a reference, and connection means connecting the reference to the input of the operational amplifier to clamp the maximum integrating level of the operational amplifier to the level of the reference.

17. System according to claim 16, wherein the reference circuit means (FIG. 7) comprises a voltage divider (87, 88; 89, 90) having one terminal connected to the output of the operational amplifier and another to a reference source (52); and a diode (91; 92) interconnecting the tap point of the voltage divider and the control input of the operational amplifier to clamp the maximum input of the operational amplifier to the voltage level of the tap point.

* * * * *